(12) United States Patent
Sturgeon et al.

(10) Patent No.: US 7,918,050 B2
(45) Date of Patent: Apr. 5, 2011

(54) METHOD AND APPARATUS FOR EXTERMINATION OF PESTS

(76) Inventors: Graeme William Sturgeon, Whitianga (NZ); David James Calder McCormick, Thames (NZ); John Russel Neustroski, Thames (NZ)

( * ) Notice: Subject to any disclaimer, the term of this patent is extended or adjusted under 35 U.S.C. 154(b) by 300 days.

(21) Appl. No.: 10/581,533

(22) PCT Filed: Dec. 6, 2004

(86) PCT No.: PCT/NZ2004/000316
§ 371 (c)(1),
(2), (4) Date: Apr. 9, 2007

(87) PCT Pub. No.: WO2005/053392
PCT Pub. Date: Jun. 16, 2005

(65) Prior Publication Data
US 2007/0266618 A1    Nov. 22, 2007

(30) Foreign Application Priority Data
Dec. 4, 2003    (NZ) ........................................ 529970

(51) Int. Cl.
*A01M 23/34*    (2006.01)
*A01M 23/00*    (2006.01)
(52) U.S. Cl. .............................................. 43/85; 43/87
(58) Field of Classification Search ................ 43/85–87; 100/9; 52/399, 582–585, 589, 592; 53/399, 53/582–585, 589, 592
See application file for complete search history.

(56) References Cited

U.S. PATENT DOCUMENTS

| 21,302 | A | * | 8/1858 | Reuthe ............................. 43/82 |
| 823,877 | A | * | 6/1906 | Kellogg ........................ 606/140 |
| 901,851 | A | * | 10/1908 | Thompson ........................ 43/85 |
| 1,091,923 | A | * | 3/1914 | Frenier ............................. 43/87 |
| 1,107,218 | A | * | 8/1914 | Kirk .................................. 43/85 |
| 1,301,708 | A | * | 4/1919 | Knutson ....................... 604/346 |
| 1,899,641 | A | * | 2/1933 | Schwartz et al. ................. 43/86 |
| 2,068,107 | A | * | 1/1937 | Nygard ............................ 100/9 |
| 2,236,936 | A | * | 4/1941 | Camp ............................... 100/9 |
| 2,247,066 | A | * | 6/1941 | Popp ............................... 43/87 |
| 2,514,038 | A | * | 7/1950 | Doolittle ........................... 100/9 |

(Continued)

FOREIGN PATENT DOCUMENTS

FR    2583617 A1 * 12/1986

(Continued)

OTHER PUBLICATIONS

European Patent Office Communication for Application No. 04 808 911.45002614 dated Sep. 24, 2010.

*Primary Examiner* — Darren W Ark
(74) *Attorney, Agent, or Firm* — Raymond Van Dyke

(57) ABSTRACT

An extermination device for exterminating pests includes a holder, trigger mechanism and a resilient ring mounted on the holder. When a pest actuates the trigger mechanism, the ring is released from the holder onto the pest, thereby killing the pest in a humane manner. A cover may be provided to protect the trigger mechanism from dirt and animals larger than target pest size. A loading device having a tapering body adapted to allow a resilient ring to be expanded from the narrow end to the wide end of the tapering body, wherein the wide end includes a formation adapted to engage with a holder of an extermination device.

44 Claims, 6 Drawing Sheets

U.S. PATENT DOCUMENTS

| | | | | |
|---|---|---|---|---|
| 2,619,964 | A * | 12/1952 | Thaete | 606/140 |
| 2,764,160 | A * | 9/1956 | Alexander et al. | 100/9 |
| 2,856,676 | A * | 10/1958 | Furst | 29/765 |
| 3,078,631 | A * | 2/1963 | Seserman | 100/9 |
| 3,271,890 | A * | 9/1966 | Davis | 43/4 |
| 3,386,371 | A * | 6/1968 | Farmer et al. | 100/9 |
| 3,726,278 | A * | 4/1973 | Scott | 606/163 |
| 3,915,150 | A * | 10/1975 | Ray | 128/842 |
| 3,965,607 | A * | 6/1976 | Lee | 43/87 |
| 3,974,762 | A * | 8/1976 | Kita et al. | 100/9 |
| 4,432,124 | A * | 2/1984 | Breuers | 29/235 |
| 4,442,765 | A * | 4/1984 | Limehouse et al. | 100/9 |
| 4,470,241 | A * | 9/1984 | Parry et al. | 100/9 |
| 4,480,536 | A * | 11/1984 | Burns | 100/9 |
| 4,519,178 | A * | 5/1985 | Crabb, Jr. | 100/9 |
| 4,628,915 | A * | 12/1986 | Chaney | 600/41 |
| 4,662,102 | A * | 5/1987 | Marcolina | 43/85 |
| 4,691,467 | A * | 9/1987 | Brimmer | 43/44.4 |
| 4,735,011 | A * | 4/1988 | Spillett | 43/86 |
| 4,791,707 | A * | 12/1988 | Tucker | 227/19 |
| 5,083,556 | A * | 1/1992 | Osbon et al. | 600/39 |
| 5,177,896 | A * | 1/1993 | Miyasaki | 43/87 |
| 5,561,940 | A * | 10/1996 | Miyasaki | 43/87 |
| 5,588,278 | A * | 12/1996 | Wynn et al. | 100/9 |
| 5,643,290 | A * | 7/1997 | Clark et al. | 606/141 |
| 5,692,336 | A * | 12/1997 | Fiore et al. | 43/85 |
| 5,746,020 | A * | 5/1998 | Fiore et al. | 43/85 |
| 5,956,891 | A * | 9/1999 | Lee | 43/87 |
| 6,125,569 | A * | 10/2000 | Link | 43/4 |
| 7,257,934 | B2 * | 8/2007 | Swift et al. | 100/9 |
| 7,565,789 | B2 * | 7/2009 | Lucas et al. | 100/9 |
| 2008/0244955 | A1 * | 10/2008 | Wilson | 43/4 |
| 2009/0090042 | A1 * | 4/2009 | Lasseur et al. | 43/85 |

FOREIGN PATENT DOCUMENTS

| | | | |
|---|---|---|---|
| GB | 2095526 A | * | 10/1982 |
| JP | 2000155364 | | 4/2001 |
| JP | 2001333683 A | * | 12/2001 |
| JP | 2003070408 A | * | 3/2003 |
| JP | 2003070408 | | 11/2003 |
| JP | 2009273423 A | * | 11/2009 |
| WO | WO 9310661 A1 | * | 6/1993 |

\* cited by examiner

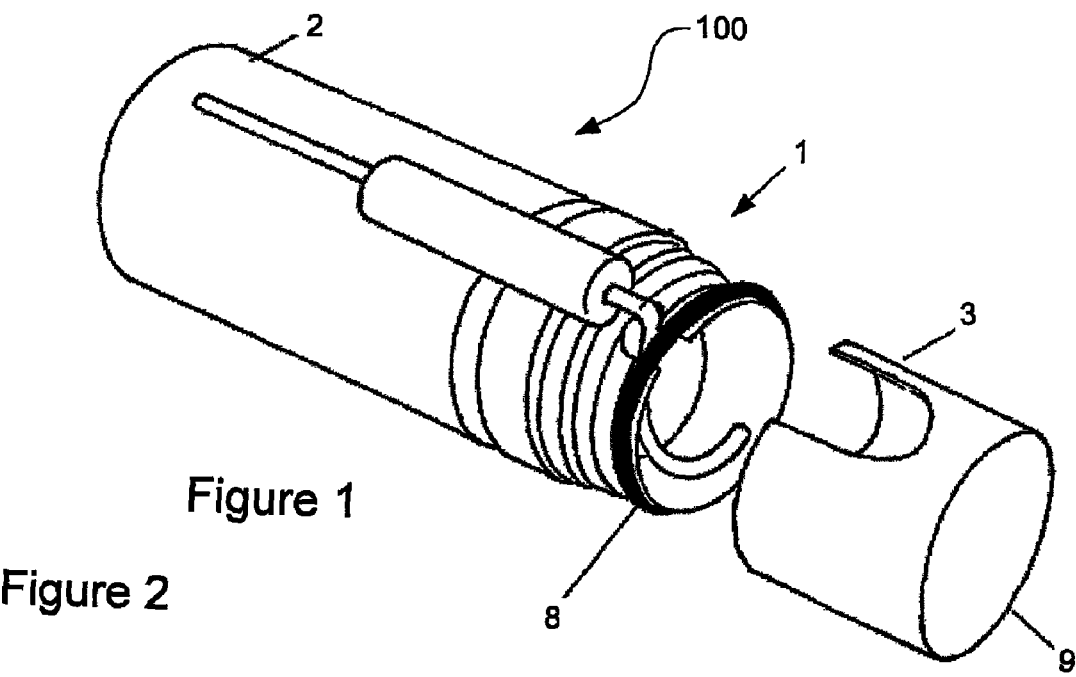
Figure 1
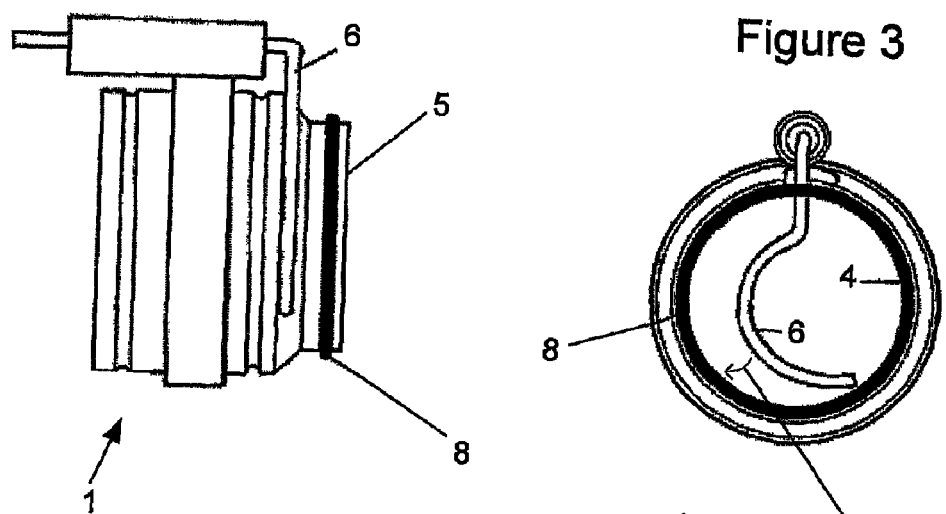
Figure 2
Figure 3
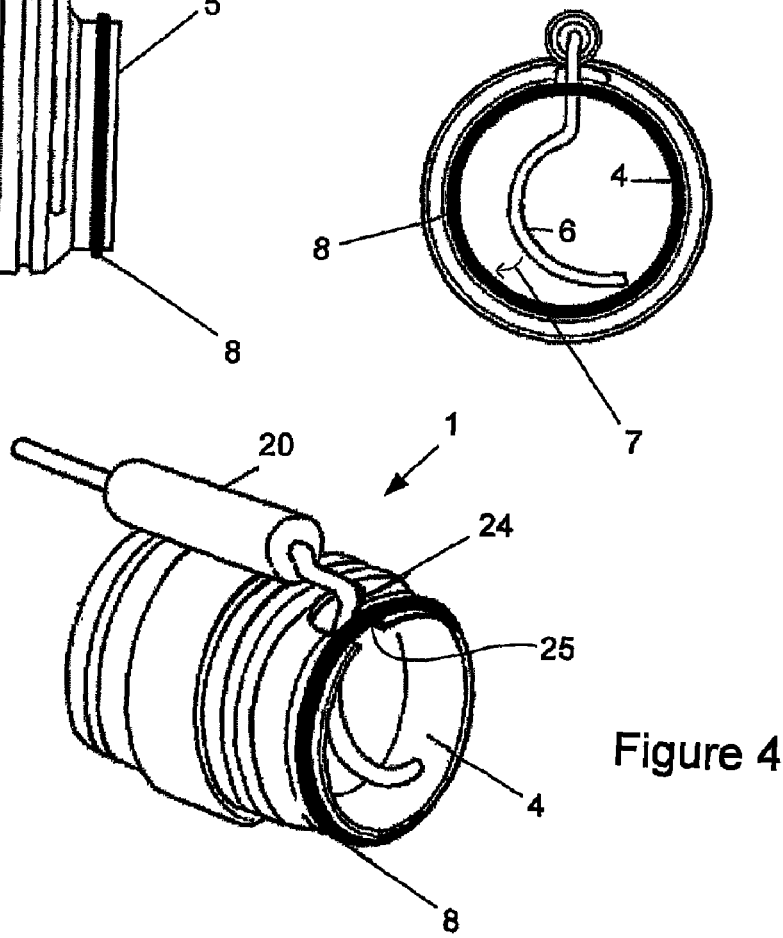
Figure 4

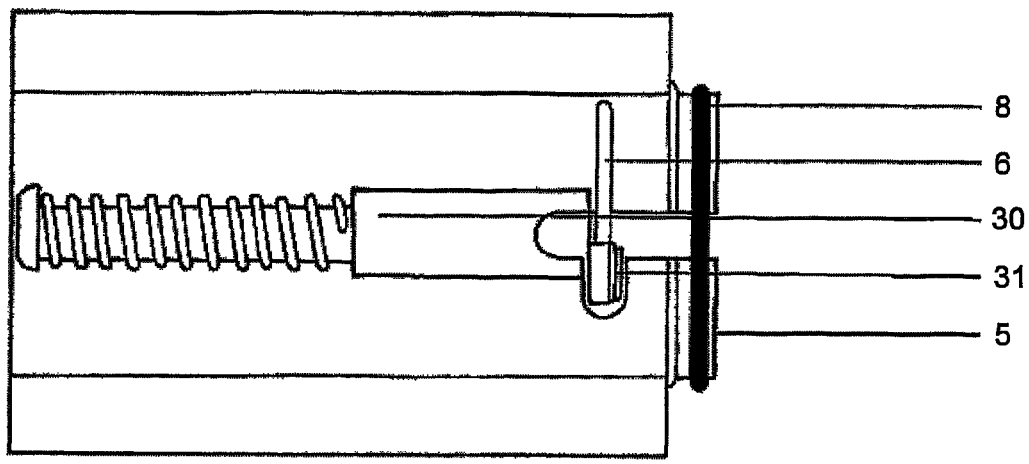
Figure 12
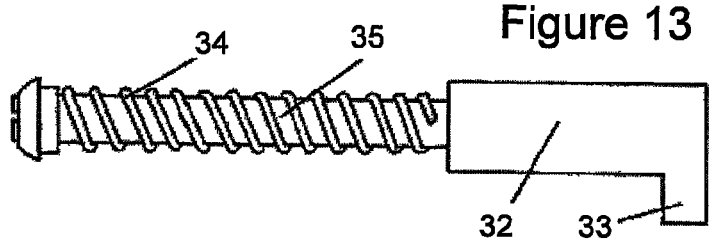
Figure 13
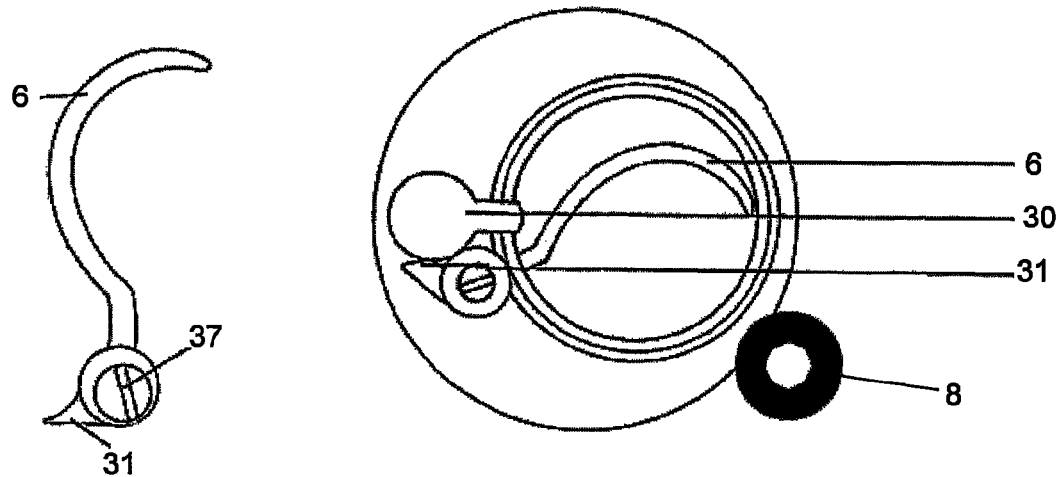
Figure 14
Figure 15

US 7,918,050 B2

METHOD AND APPARATUS FOR EXTERMINATION OF PESTS

FIELD OF THE INVENTION

The invention relates to a method and apparatus for the extermination of pests, in particular rats, stoats and other vermin.

BACKGROUND OF THE INVENTION

In a number of countries such as New Zealand, introduced species of animal have had a detrimental effect on the indigenous or native plant, bird, insect and other life.

In an attempt to control and exterminate pests, whether introduced species or not, a large number of different traps and similar mechanisms have been designed to capture and/or kill pests. A difficulty with many such traps is that the trapped pest does not die humanely and this can be a particular concern. A typical trap which is inhumane is the type of trap generally known as a gin trap which has a set of jaws to clamp a part of the pest. Normally in gin traps a pest is held until it either dies naturally or alternatively is killed by a person attending the trap.

An object of the present invention is to provide a lightweight versatile user friendly relatively inexpensive means for exterminating pests which at least offers a useful alternative choice.

A further object of the invention is to provide a means for exterminating a pest which substantially eliminates the risk of killing wildlife which is intended to be saved or preserved by use of the means for extermination, or to at least provide the public with a useful choice.

SUMMARY OF THE INVENTION

In a first aspect, the invention provides an extermination device, comprising a holder and a trigger mechanism, the holder being configured to hold an expanded resilient ring and the extermination device being configured to release the resilient ring, such that it contracts around a pest, when the trigger mechanism is actuated by the pest.

In a second aspect, the invention provides a method of exterminating a pest, comprising the steps of: expanding a resilient ring; and releasing the resilient ring onto a pest when the resilient ring is located around the pest.

BRIEF DESCRIPTION OF THE DRAWINGS

Examples of the invention will now be described with reference to the accompanying drawings in which:

FIG. 1 is a perspective view from the side of an extermination device according to the invention;

FIG. 2 is a side view of the extermination device shown in FIG. 1;

FIG. 3 is an end view of the extermination device;

FIG. 4 is a perspective view from the side of the extermination device;

FIG. 12 is a side plan view of the device of FIG. 9, showing internal features;

FIG. 13 shows the firing mechanism of the device of FIG. 9;

FIG. 14 shows the trigger mechanism of the device of FIG. 9;

FIG. 15 is a view similar to FIG. 9, showing the device after it has been triggered and has released the resilient ring;

DESCRIPTION OF THE INVENTION

Figure 5:
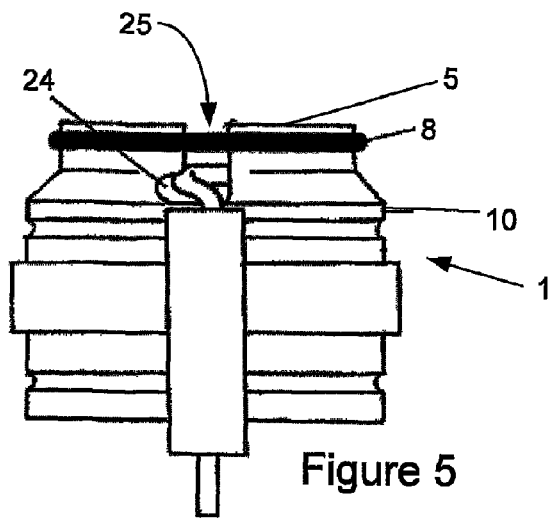
FIG. 5 is a plan view of the exterminator device.

Examples of the invention will now be described with reference to the accompanying drawings. The first example in FIGS. 1 to 5 of the drawings show the actual size of an extermination device designed for rats or stoats. It is to be appreciated that for other animals the overall size and dimensions of the extermination device may be larger or smaller as needed to suit the size of the target pests.

In FIG. 1 is shown an extermination device including a holder 100 and a front cover 3.

The holder 100 is shown in more detail in FIGS. 2 to 4. The holder 100 comprises a central section 1 and a cover 2, and is tubular, with an internal bore 4. The holder may be circular in cross-section as shown in the drawings, or may have another suitable cross-section. The diameter of the bore 4 is chosen to suit the target pest and the tube has an entrance or open mouth 5 at a first end where the pest enters. For small pests such as mice, rats and stoats the diameter is preferably in the range 25 to 40 mm. For larger pests such as polecats, possums and cats, the diameter is preferably in the range 60 to 100 mm.

The second end of the holder 100 is formed by the cover 2, creating a closed region in which food or an attractant is placed.

The extermination device has a trigger operated by a trigger mechanism 6 shown in FIG. 3. To set the trigger mechanism, it is pushed backwards in a slot 25 and to the right (as shown in FIG. 4), such that it sits in a notch 24 in the holder. When a pest enters the trap, the trigger mechanism 6 moves arcuately (as shown by arrow 7 in FIG. 3), so that it is released from the notch and is forced forwards by a spring 20 to release the resilient ring 8. The resilient ring 8 is mounted relative to the mouth 5 of the extermination device in a release position, adjacent to the open mouth 5, such that after it slides off the open mouth 5 it contracts around whatever is within the open mouth 5 of the holder 100. Other trigger mechanisms may also be suitable.

The resilient ring 8 may be formed of natural or synthetic rubber or a composite material. It could also be formed from metal in the form of a spring, or at least partly of rigid material with a biasing means tending to force sides of the ring together. While the resilient ring is preferably circular in shape, it could, for example, be formed from a rectangle of resilient material with a hole cut through it. Other configurations may also be suitable.

The resilient ring 8 has a normal diameter that is significantly less than the diameter of the holder at the release position so that on release from the open mouth 5 it contracts to its normal size which is less than the size of the neck of the target pest.

On activation of the trigger mechanism 6 by a pest whose head is within the mouth 5 the rubber or composite ring 8 traps whatever is in the mouth of the extermination device. Any animal or pest that activates the trip arm 6 therefore has immediately placed around its neck a resilient ring which will cut off the blood and air supply to the animal thereby killing it humanely.

Since the ring 8 is not retained by the extermination means, the animal may still move away from the site of the extermination means, so that other pests will be able to actuate the trigger mechanism.

As shown in FIG. 1, a front cover 3 can be provided and is designed to protect against accidental tripping of the trip arm. The front cover 3 has an opening 9 to allow a pest to access the opening 5.

The front cover 3 connects with the holder at surface 10 and is positioned so that the target animal can still reach and actuate the trigger mechanism.

Figure 6:
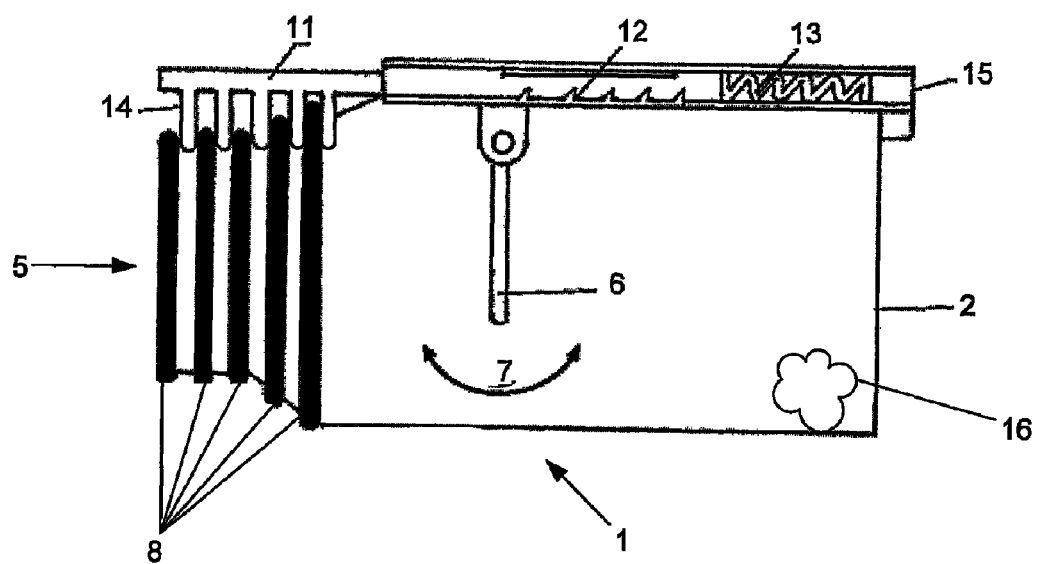
FIG. 6 is a vertical section through an example of an extermination device incorporating a reloading and/or resetting mechanism with a plurality of resilient rings.

In the second example shown in FIG. 6 the extermination device has similar parts to those incorporated in the first example referenced by the same numerals. In this case the exterminator device has an automatic loading mechanism. The loading mechanism includes a moveable shaft 11 with a ratchet mechanism 12 operated by the trigger mechanism 6. Movement of the shaft 11 is under the bias of a spring 13. The shaft 11 includes stops 14. A hinged cover 15 is provided to enable access to the mechanism when it is being reloaded with more or additional rings 8.

In use when an animal pest tries to eat bait or attractant 16 it knocks the trigger mechanism 6. A first ring is released from the release position, contracting around the pest's neck. The spring 13 will then push forward and the trigger mechanism will be reset on its next notch ready to be tripped again. The forward movement of the shaft 11 presents the next in the succession of rings 8 to the release position adjacent to the mouth 5 of the holder 100.

Figure 8:
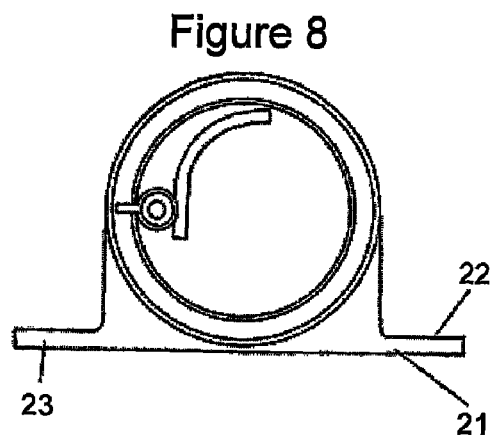
FIG. 8 is a plan view of the device of FIG. 7.
Figure 7:
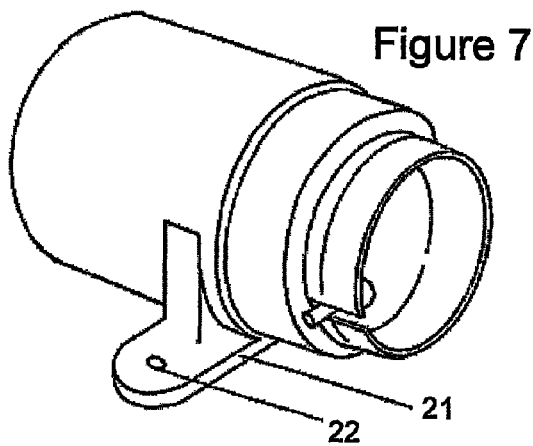
FIG. 7 is a perspective view of an example of an extermination device having an internal trigger mechanism.

FIGS. 7 and 8 show a third example of an extermination device according to the invention. This example differs from the device described above in that the trigger mechanism is located within the holder. This protects the trigger mechanism from dirt, twigs and the like, which may prevent it from functioning correctly. The trigger functions in a manner similar to that described above.

These figures also show the device with a base plate 21 for mounting the extermination device in a suitable position. The base plate 21 preferably includes holes 22, 23 to facilitate such mounting.

Figure 9:
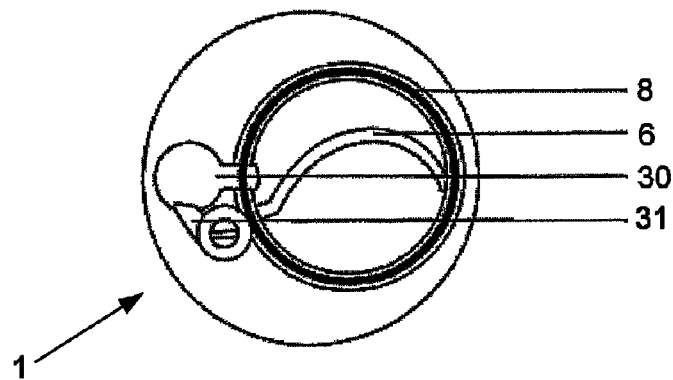
FIG. 9 is a front plan view of a further embodiment of an extermination device.
Figure 10:
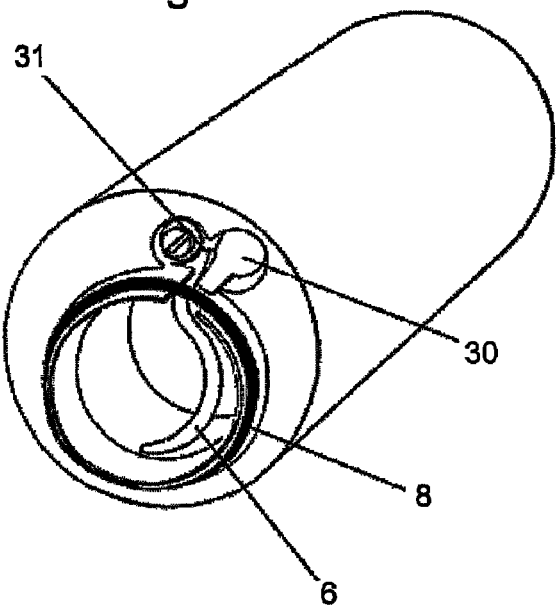
FIG. 10 is a perspective view of the device of FIG. 9.
Figure 11:
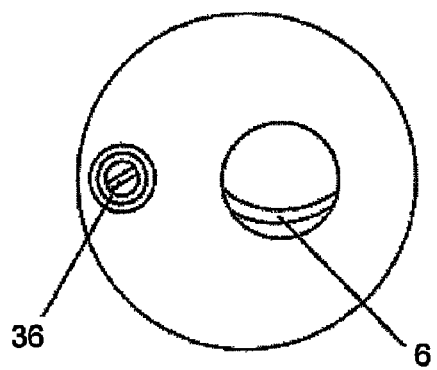
FIG. 11 is a rear plan view of the device of FIG. 9.

A preferred embodiment of the invention is shown in FIGS. 9 to 19. FIG. 9 is a front plan view, and FIG. 10 is a perspective view, of the extermination device 1, showing the trigger mechanism 6, firing hammer 30 and resilient ring 8. With reference to FIG. 13, the firing hammer 30 includes a generally cylindrical section 32 and a protrusion 33. The cylindrical section 32 slides on rod 35, which is joined to the rear face of the device housing by a screw 36, as shown in FIG. 11. A spring 34 is mounted on the rod 35, to urge the firing hammer 30 along the rod 35 towards the resilient ring 8.

With reference to FIG. 14, the trigger mechanism 6 is formed integrally with a lug 31 and is attached to the device housing by a screw 37.

Figure 16:
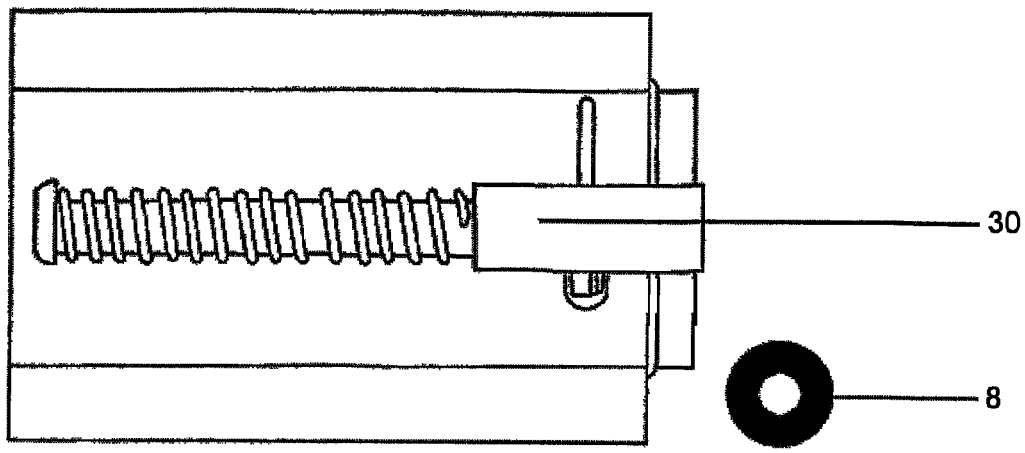
FIG. 16 is a view similar to FIG. 12, showing the device after it has been triggered and has released the resilient ring.

In the cocked position shown in FIG. 12, the firing hammer compresses the spring 34 and is held in position by the lug 31, as best shown in FIG. 9. When a pest enters the trap, forcing the trigger mechanism 6 upwards, the trigger mechanism pivots around the screw 37, such that the lug 31 no longer restricts movement of the firing hammer 30. The firing hammer slides along the rod 35 towards the resilient ring 8. The protrusion 33 forces the resilient ring 8 off the holder, onto the pest. The position of the extermination device in the fired position as shown in FIGS. 15 and 16.

Figure 17:
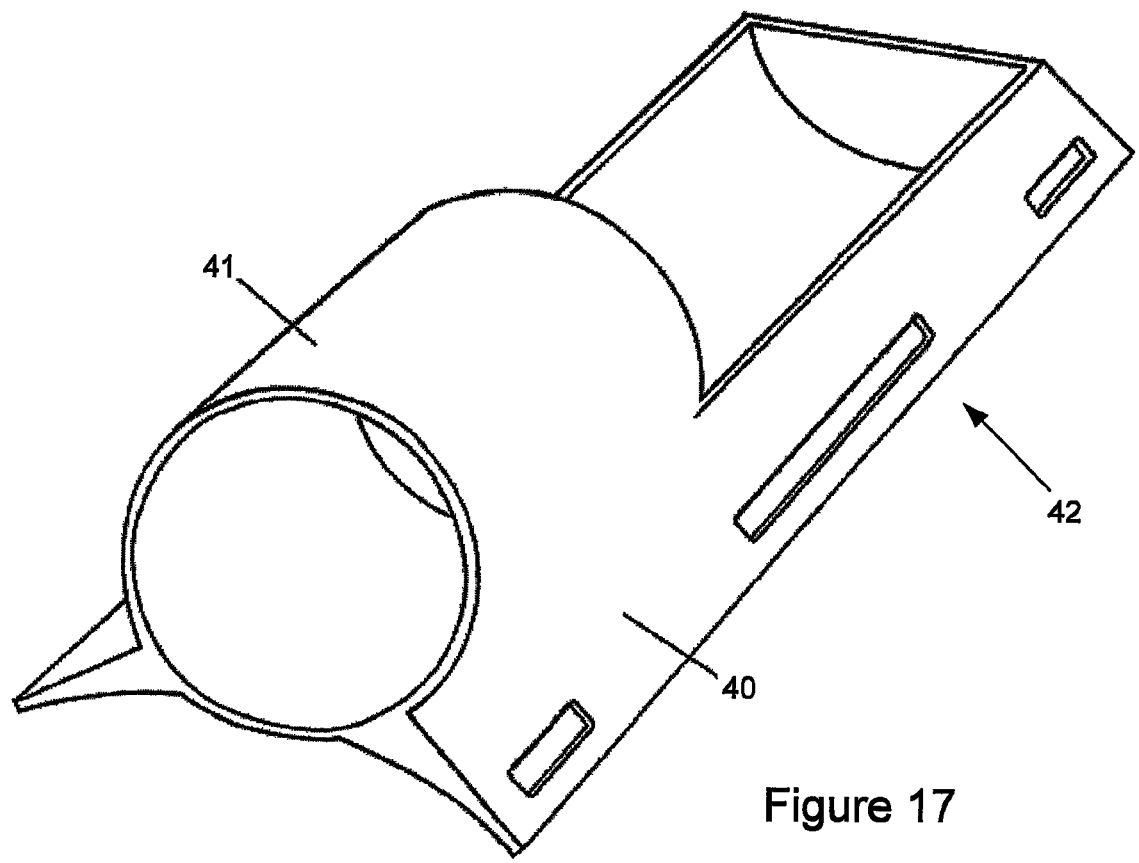
FIG. 17 is a perspective view of a cover for use with the extermination device of FIG. 9.
Figure 18:
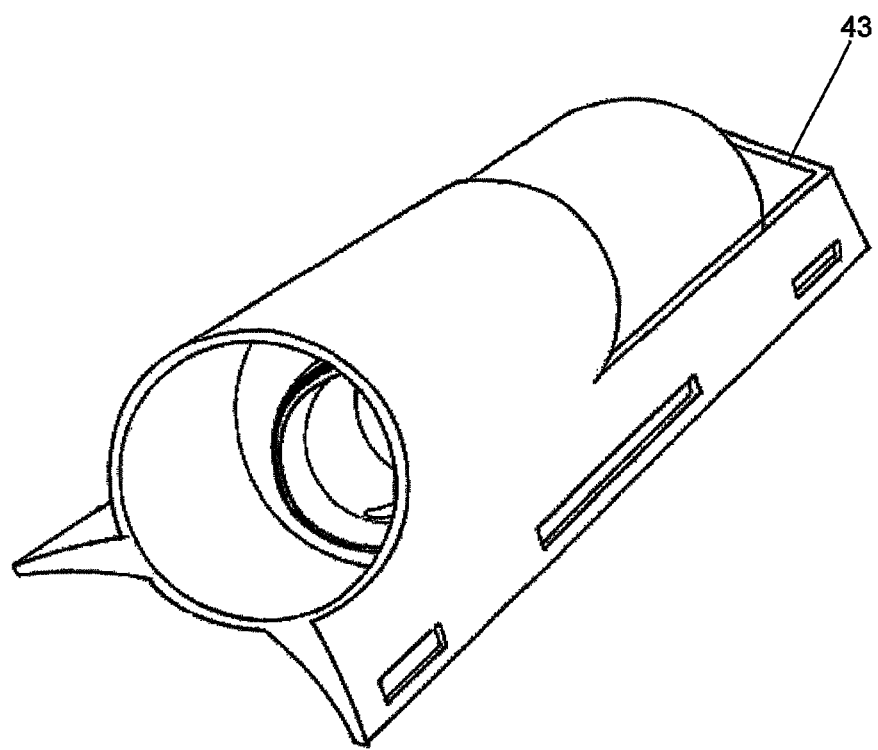
FIG. 18 is a perspective view of the device of FIG. 9 and the cover of FIG. 17 in an assembled state.

FIG. 17 shows a cover 42 for use with the extermination device of this embodiment. The cover 42 includes a base section 40 and a cylindrical section 41. The base section 40 may include holes and/or slots for securing the extermination device to the ground, a tree etc. The device shown in FIGS. 9 to 16 is assembled with the cover 42, as shown in FIG. 18. FIG. 18 shows the device and cover in a partially assembled state. The device is pushed into the cover through the cylindrical section 41. In a fully assembled state the device would rest against the end 43 of the cover. This arrangement protects the mechanism of the device from contamination by dirt etc and prevents animals of a size greater than the diameter of the cylindrical section 41 from activating the trap.

Figure 19:
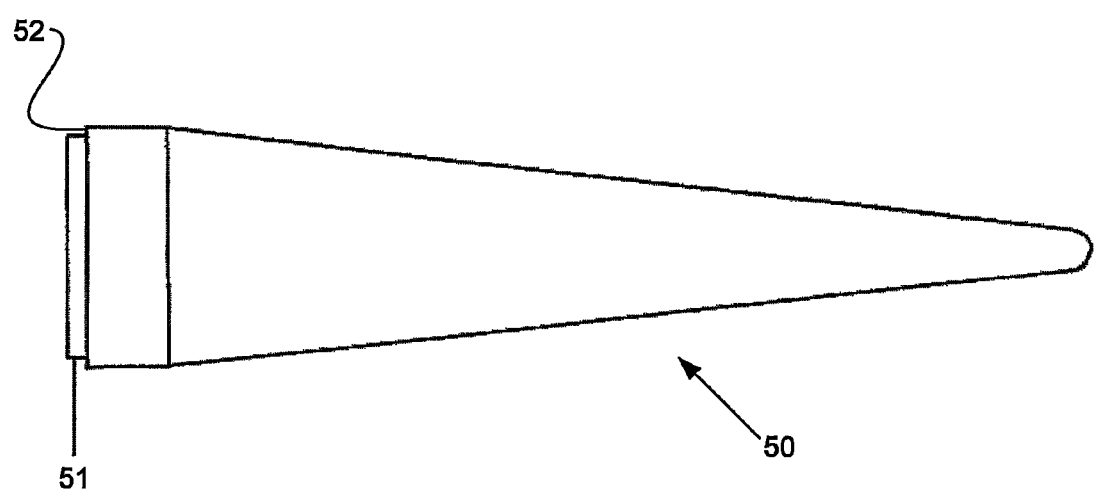
FIG. 19 is a plan view of a loading device for use with the extermination device of FIG. 9.

FIG. 19 shows a loading device for use with the extermination device of FIGS. 9 to 16. The loading device includes a generally conical section 50 and a coupling section 51. In use, the device is set in the cocked position and the coupling section 51 is inserted into the device, such that the shoulder 52 sits flush with the open mouth 5 of the device. A resilient ring 8 can then be forced along the generally conical section 50 and into the release position on the extermination device. The loading device is then removed.

The device may be placed in any position that a targeted pest can access. The device may be placed on the ground, in a tree or attached to a board or post, for example.

While the present invention has been illustrated by the description of the embodiments thereof; and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A kit for a vermin extermination device comprising:
   a first housing, said first housing having a passage therethrough,
   a second housing, said second housing having a closed passage therein with an open end, said first and second housings being configurable for alignment and connection so that said passage is substantially coterminus with the open end of said closed passage, forming a common passage within said first and second housings,
   a trigger device having a trigger, said trigger when configured being placed between a bait or attractant within said closed passage and said open end of said closed passage, a vermin actuating said trigger device while within said common passage,
   a ring release mechanism when configured being connected to said trigger mechanism,
   at least one resilient ring, said ring release mechanism when configured releasing said at least one resilient ring after said at least one resilient ring is placed thereon and is thereby expanded, upon actuation of said trigger device by said vermin, onto said vermin in said common passage, said at least one expanded resilient ring, when configured and upon release by said ring release mechanism onto said vermin, detaches from said vermin extermination device so as to be free therefrom and contracts onto said vermin, whereby said vermin is killed by the configured vermin extermination device.

2. A vermin extermination device comprising:
a first housing, said first housing having a passage therethrough,
a second housing, said second housing having a closed passage therein with an open end, said first and second housings aligned and connected so that said passage is substantially coterminus with the open end of said closed passage, forming a common passage within said first and second housings,
a trigger device having a trigger, said trigger placed between a bait or attractant within said closed passage and said open end of said closed passage, a vermin actuating said trigger device while within said common passage,
a ring release mechanism connected to said trigger mechanism,
at least one resilient ring, said ring release mechanism releasing said at least one resilient ring after said at least one resilient ring is expanded, upon configuration of said at least one expanded resilient ring and actuation of said trigger device by said vermin, onto said vermin in said common passage,
said at least one expanded resilient ring, upon release by said ring release mechanism onto said vermin, detaches from said vermin extermination device so as to be free therefrom and contracts onto said vermin,
whereby said vermin is killed.

3. The extermination device as claimed in claim 2, wherein the second housing is configured to hold a plurality of expanded resilient rings and to hold a first one of the expanded resilient rings at a release position, and
the extermination device is configured to release the first one of the expanded resilient rings when the trigger device is actuated and to move a second one of the expanded resilient rings to the release position when the first one of the expanded resilient rings is released from the release position.

4. The extermination device as claimed in claim 3, further comprising a biasing means configured to apply a force to the second one of the resilient rings, towards the release position.

5. The extermination device as claimed in claim 4, wherein the biasing means is coupled to the trigger device.

6. The extermination device as claimed in claim 2, configured to release the at least one expanded resilient ring, such that it contracts around a neck of the vermin.

7. The vermin extermination device according to claim 2, further comprising:
loading device means having a tapering body adapted to allow said resilient ring to be expanded from a narrow end to a wide end of the tapering body, wherein the wide end includes a formation adapted to engage with said second housing of said vermin extermination device.

8. The vermin extermination device according to claim 2, wherein said first housing has a passage portion with said passage therethrough and a base portion extending beyond said passage portion and including a reception portion for situating said second housing thereon,
whereby said first and second housings are aligned and connected.

9. The vermin extermination device according to claim 2, wherein the vermin are selected from the group consisting of mice, rats, stoats, polecats, possums and other animals considered vermin.

10. The vermin extermination device according to claim 9, wherein the diameter of said common passage for said vermin is selected from the group consisting of about 25-40 mm, about 60-100 mm, and diameters consistent with said vermin.

11. The vermin extermination device according to claim 2, wherein said extermination device is affixable to an object or surface selected from the group consisting of the ground, a tree, a pole, a post, a board, a horizontal surface and a vertical surface.

12. The vermin extermination device according to claim 2, wherein said bait or attractant is placed within said closed passage prior to configuring said vermin extermination device to kill said vermin.

13. The vermin extermination device according to claim 2, wherein said trigger device is disposed within said common passage.

14. The vermin extermination device according to claim 2, further comprising a spring means for assisting the ring release mechanism in releasing said at least one expanded resilient ring.

15. The vermin extermination device according to claim 14, wherein said spring means, upon actuation of said trigger device by said vermin, applies a force to said ring release mechanism, forcing said at least one expanded resilient ring onto said vermin.

16. The vermin extermination device according to claim 15, wherein said expanded resilient ring is disposed on said second housing adjacent the open end thereof, whereby said force from said spring means pushes said at least one expanded resilient ring free of the second housing.

17. The vermin extermination device according to claim 16, wherein said second housing comprises a notch at said open end, said spring means connected to said trigger device through said notch, said spring means, upon actuation by said vermin, applying said force to said at least one expanded resilient ring along said notch, whereby said spring means pushes said at least one expanded resilient ring off said second housing onto said vermin.

18. The vermin extermination device according to claim 14, wherein said spring means, upon actuation of said trigger device by said vermin, applies a lateral force to said expanded resilient ring.

19. The vermin extermination device according to claim 14, wherein said extermination device is armed by a user contracting said spring means.

20. The vermin extermination device according to claim 14, wherein said trigger device comprises:
a firing means having a cocked position and a release position, and
said spring means for biasing said firing means when in said cocked position to said release position,
whereby upon actuation of said trigger device by said vermin, said firing means, through action by said spring means, moves from said cocked position to said release position.

21. The vermin extermination device according to claim 20, wherein said firing means, under the action of said spring means, pushes said at least one expanded resilient ring free of said extermination device and onto said vermin.

22. The vermin extermination device according to claim 2, further comprising leverage means for leveraging the energy input in arming said at least one expanded resilient ring to release said at least one expanded resilient ring.

23. The vermin extermination device according to claim 22, wherein said extermination device is armed by a user placing said at least one resilient ring onto said ring release mechanism.

24. The vermin extermination device according to claim 22, wherein said leverage means comprises:
a firing means having a cocked position and a release position, and
a biasing means for biasing said firing means when in said cocked position to said release position,
whereby upon actuation of said trigger device by said vermin, said firing means, through action by said biasing means, moves from said cocked position to said release position.

25. The vermin extermination device according to claim 24, wherein said firing means, under the action of said biasing means, pushes said at least one expanded resilient ring free of said extermination device and onto said vermin.

26. The vermin extermination device according to claim 2, wherein said resilient ring is made of a material selected from the group consisting of: natural rubber, synthetic rubber, a composite material and a metal.

27. The vermin extermination device according to claim 2, wherein said at least one expanded resilient ring has a configuration selected from the group consisting of: circular and rectangular.

28. The vermin extermination device according to claim 2, wherein said at least one expanded resilient ring, upon release, contracts to a normal size, the contracted resilient ring at said normal size having an inner diameter less than a neck size of a vermin.

29. The vermin extermination device according to claim 2, wherein said trigger device and said ring release mechanism are connected to said second housing.

30. The vermin extermination device according to claim 29, wherein a user arms said trigger device and said ring release mechanism on said second housing while said second housing is separate from said first housing, and wherein said user then connects said first and second housings, arming the vermin eradication device.

31. The vermin extermination device according to claim 2, further comprising interlocking means for connecting said first housing with said second housing.

32. The vermin extermination device according to claim 2, wherein diameters of said passage and said closed passage differ.

33. The vermin extermination device according to claim 32, wherein the diameter of said passage is greater than the diameter of said closed passage,
whereby said vermin entering said passage feels safe to enter said closed passage.

34. A method of exterminating vermin, the method comprising employing the vermin extermination device of claim 2.

35. The vermin extermination device comprising:
a first housing having a base portion and a passage portion, said passage portion having a passage therethrough, a vermin entering said extermination device at a first end thereof, said base portion extending beyond the second end of said passage portion and having a reception portion for situating said second housing thereon;
a second housing having a closed passage therein with an open end, said second housing seated in said reception portion of said first housing, said second end of said passage portion and said open end of said second housing being aligned so that said passage is substantially coterminus with said closed passage, forming a common passage through said first and second housings;
a trigger device having a trigger disposed within said common passage, said trigger placed between a bait or attractant within said closed passage and said open end of said closed passage, a vermin actuating said trigger device while within said common passage;
a ring release mechanism connected to said trigger device; and
at least one resilient ring, said ring release mechanism releasing said at least one resilient ring after said at least one resilient ring is expanded, upon configuration of said at least one expanded resilient ring and actuation of said trigger device by said vermin, onto said vermin in said common passage, said at least one expanded resilient ring detaching from said extermination device so as to be free therefrom and contracting onto said vermin,
whereby said vermin is killed.

36. The vermin extermination device according to claim 35, further comprising leverage means for leveraging the energy input in arming said at least one expanded resilient ring to release said at least one expanded resilient ring.

37. The vermin extermination device according to claim 36, wherein said extermination device is armed by a user placing said at least one resilient ring onto said ring release mechanism.

38. The vermin extermination device according to claim 36, wherein said leverage means comprises:
a firing means having a cocked position and a release position, and
a biasing means for biasing said tiring means when in said cocked position to said release position,
whereby upon actuation of said trigger device by said vermin, said firing means, through action by said biasing means, moves from said cocked position to said release position.

39. The vermin extermination device according to claim 38, wherein said firing means, under the action of said biasing means, pushes said at least one expanded resilient ring free of said extermination device and onto said vermin.

40. A method of exterminating vermin comprising:
loading at least one resilient ring onto a ring release mechanism, said at least one resilient ring loaded being expanded thereby;
setting a trigger device having a trigger;
positioning said trigger within a common passage;
forming said common passage by aligning and connecting a first housing having a passage therethrough with a second housing, said second housing having a closed passage therein with an open end, said first and second housings aligned so that said passage is substantially coterminus with said open end, forming said common passage;
placing said trigger between a bait or attractant within said closed passage and said open end of said closed passage,
wherein upon actuation of said trigger by a vermin, triggering the release of said at least one expanded resilient ring from said extermination device onto said vermin in said common passage such that said at least one expanded ring is free from said extermination device,
whereby the at least one released expanded resilient ring contracts upon and kills said vermin.

41. The method of exterminating vermin according to claim 40, further comprising:

arming said extermination device by a user contracting a spring means, said spring means providing the energy to activate said extermination device after actuation by said vermin.

42. The method of exterminating vermin according to claim 40, further comprising:
arming said extermination device by a user expanding said at least one resilient ring onto said ring release mechanism, said at least one expanded resilient ring providing the energy to activate said extermination device after actuation by said vermin.

43. The method of exterminating vermin according to claim 40, wherein a plurality of said resilient rings are loaded onto said ring release mechanism, and wherein said ring release mechanism releases one of said plurality of resilient rings onto said vermin.

44. The method of exterminating vermin according to claim 43, wherein after said one resilient ring is released, moving a second of said resilient rings to a release position.

* * * * *

UNITED STATES PATENT AND TRADEMARK OFFICE
CERTIFICATE OF CORRECTION

| | | |
|---|---|---|
| PATENT NO. | : 7,918,050 B2 | Page 1 of 1 |
| APPLICATION NO. | : 10/581533 | |
| DATED | : April 5, 2011 | |
| INVENTOR(S) | : Graeme William Sturgeon et al. | |

It is certified that error appears in the above-identified patent and that said Letters Patent is hereby corrected as shown below:

Title Page, Item (75) Inventors, should be corrected to read as follows:

--Graeme William Sturgeon, Whitianga (NZ); David James Calder McCormick, Thames (NZ); John Russel Neustroski, Thames (NZ); David Wells, Rotorua (NZ); Luc Desbonnets, Auckland (NZ)--.

Signed and Sealed this
Twenty-eighth Day of June, 2011

David J. Kappos
*Director of the United States Patent and Trademark Office*